United States Patent [19]
Link

[11] Patent Number: 5,697,270
[45] Date of Patent: Dec. 16, 1997

[54] MULTIPLE-SPINDLE MACHINE TOOL

[75] Inventor: Helmut Link, Aichwald, Germany

[73] Assignee: Index-Werke GmbH & Co. KG Hahn & Tessky, Esslingen, Germany

[21] Appl. No.: 525,479

[22] Filed: Sep. 8, 1995

[30]     Foreign Application Priority Data

Feb. 10, 1995 [DE]   Germany ................. 195 04 369.3

[51] Int. Cl.$^6$ .................................................. B23B 13/04
[52] U.S. Cl. ........................... 82/129; 82/141; 82/147
[58] Field of Search ..................... 82/122, 124, 149, 82/129, 141, 142, 138, 147

[56]             References Cited

U.S. PATENT DOCUMENTS

| | | | |
|---|---|---|---|
| 1,574,726 | 2/1926 | Bullard | 82/129 X |
| 1,671,354 | 5/1928 | De Leeuw . | |
| 1,743,862 | 1/1930 | Morris | 82/129 X |
| 2,032,646 | 3/1936 | Adams . | |
| 2,044,496 | 6/1936 | Bullard | 82/129 X |
| 3,792,633 | 2/1974 | Filipiev et al. | 82/124 |
| 4,545,271 | 10/1985 | Romi | 82/149 |
| 5,062,330 | 11/1991 | Trautmann et al. | 82/147 |
| 5,127,140 | 7/1992 | Oiwa et al. | 82/129 X |

FOREIGN PATENT DOCUMENTS

| | | |
|---|---|---|
| 0 215 209 | 3/1987 | European Pat. Off. . |
| 950 525 | 11/1956 | Germany . |
| 20 12 461 | 3/1970 | Germany . |
| 34 16 660 | 11/1985 | Germany . |

*Primary Examiner*—Daniel W. Howell
*Assistant Examiner*—Henry W. H. Tsai
*Attorney, Agent, or Firm*—Barry R. Lipsitz; Ralph F. Hoppin

[57]                 ABSTRACT

A compact multiple-spindle machine tool has a spindle support which is rotatably mounted on a machine frame. Several work piece spindles are carried by the spindle support and may be positioned in various rotational positions when the spindle support is rotated about a rotational axis. A work piece is clamped to a spindle and can be machined by a tool in a work area. The machine frame has a bottom part which stands on a base. A stand extends upwards from the base to carry the spindle support. The work piece spindles are arranged in spindle positions around the stand. The working area for machining the work pieces which are held by the work piece spindles are also arranged around the stand.

60 Claims, 8 Drawing Sheets

MULTIPLE-SPINDLE MACHINE TOOL

BACKGROUND OF THE INVENTION

The invention relates to a multiple-spindle machine tool comprising a machine frame which rises above a base, a spindle support mounted on the machine frame to rotate about a rotational axis passing through the base and extending away therefrom, several work piece spindles arranged on the spindle support around the rotational axis each suspended in individual spindle positions, the spindle axes of said work piece spindles passing through the base and extending away from it, and said work piece spindles may be positioned in various rotational positions by rotating the spindle support around the rotational axis, a work area, in which the work piece spindles protrude with their work piece clamping means, and a tool arranged in the working area with which a work piece clamped in the work piece clamping means of one of the work piece spindles can be machined.

Such a machine tool is known, for example, from the article by Prof. Eversheim and Dipl.-Ing. Päffekhofen entitled "Konzeption handhabungsgerechter Drehmaschinen, die Automatisierung verändert das Bild der Werkzeugmaschine" [Design of easy to operate turning machines; Automation changes the image of the machine tool], published in the journal "Industrieanzeiger", No. 19 of 19 Mar. 1983. FIG. 4 in this article illustrates the arrangement of two suspended spindles on a spindle drum, which is itself mounted to rotate relative to a machine frame in the form of an inverted U, and with a tool carriage movable in two axial directions provided on a side support of the machine frame.

In conjunction with this solution it is also proposed that an arrangement whereby the working spindles may be run in axial direction replaces the use of handling means.

In addition, a turning machine with a single suspended spindle which can run along its spindle axis is known from DE-C 34 16 660 or also from EP-B 0 215 209. The single spindle machines disclosed in the two last-mentioned publications have a numerically controlled spindle, which can slide in the direction of the Z axis and also serves to guide the work pieces relative to a stationary tool during machining.

The disadvantage of the first-mentioned multiple-spindle machine tool is that the machine frame requires a large amount of space and that access to the work piece clamping chucks in the two spindle stations is hindered by the vertically running side support of the machine frame.

Therefore, the object of the invention is to improve a multiple-spindle machine tool of the type known in the art so that it has as compact a structure as possible.

SUMMARY OF THE INVENTION

This object is achieved according to the invention with a multiple-spindle machine tool of the above-described type in that the machine frame comprises a bottom part standing on the base and from which a stand extends upwards; that the stand extends as far as the spindle support and supports this; that the work piece spindles are arranged in their spindle positions around the stand; and that the working area for machining the work pieces held in the work piece spindles is arranged around the stand.

Hence, the advantage of the solution according to the invention is that the machine frame has a compact structure because it is provided with a stand, which is surrounded by work piece spindles and therefore the unusable "dead space" within the path of movement of the work piece spindles is used to house the spindle support.

As a result, there is a substantial improvement in the use of available space over that in the prior art and, moreover, it is possible to construct those parts of the machine frame required in addition to the stand to stabilise and position the spindle support so that they require less space, and this in turn improves access to the individual work piece spindles and the tools.

The term work piece spindle is used in the scope of the present invention to mean a device which comprises a work piece holding means which may be rotated about the spindle axis by means of a drive, and said work piece holding means may be driven by the drive, for example, at the rotational speeds and moments usual for conventional turning machining, or may be positioned only in defined positions by the drive, in which case the drive is preferably constructed as a numerically controlled C axis, or may be operated by the drive both as a conventional turning spindle and as a numerically controlled C axis.

A particularly advantageous solution in this case is one in which the stand lies radially inside the paths all the work piece spindles run through during rotation of the spindle support, thus rendering it impossible for the rotational movement of the spindle support to be hindered by the stand, and enabling the spindle support to continue to rotate constantly in one direction of rotation in an extreme case.

Although the stand could be arranged so that the rotational axis of the spindle support runs to the side of it, it is particularly advantageous if the rotational axis of the spindle support passes through the stand so that there are no substantial one-sided moments acting on the stand.

It is particularly advantageous here if the stand is constructed symmetrically to the rotational axis so that, on the one hand, the stand is stressed as symmetrically as possible, and on the other hand to ensure that the mechanical behaviour of the stand is symmetric to the rotational axis, e.g. in the case of thermal expansions.

In principle, the stand can be constructed in a wide variety of forms. For example, it would be possible to construct the stand as a solid structure. A solution to provide a particularly dimensionally stable arrangement as well as to minimise the weight is to construct the stand as a hollow unit.

It is also advantageous to provide the stand with reinforcing ribs to improve its mechanical rigidity.

A particularly expedient solution with respect to the arrangement and configuration of the working area provides that an upper part of the stand extends above the bottom part essentially unsupported. The substantial advantage of this solution is that additional support elements for the stand which may be in the way in the work area can be avoided as a result.

In principle, the stand could also be constructed so that it stands alone on the base with a foot as bottom part.

A particularly stable arrangement of a machine frame, however, provides that the bottom part comprises an external part which is located radially outside the stand, runs around it and is supported on the base. Because of the larger support area on the base, such an external part located radially outside the stand and running around it provides more stability for fixture of the stand relative to the base.

Particularly stable support is provided for the stand if it is connected to the external part. This can be achieved by a particularly simple structure if a foot of the stand is connected to the external part, in which case the foot is preferably connected to the external part via support walls running radially to the rotational axis which do not hinder radial access to the sections lying between them.

It is of advantage with respect to the dimensional stability of the machine frame if the foot of the stand and the bottom part of the machine frame form a single part.

It has proved particularly expedient for assembly of a machine tool according to the invention if the stand is divided by a dividing plane running parallel to the base between the foot and the upper part of the stand, since this assures simple manufacture of the bottom part with the foot as well as simple manufacture of the upper part of the stand.

No exact details have been given so far with respect to the arrangement of the spindle support on the machine frame. The spindle support could thus be mounted on its outer periphery, as is usual with multiple-spindle machines with horizontally positioned spindles. It is particularly advantageous in the present solution, however, if the spindle support is rotatably mounted via a bearing which lies radially inside the paths the work piece spindles follow during rotation of the spindle support. This solution provides the possibility of mounting the spindle support directly on the stand, and thus allows a machine frame to be constructed which does not engage over the spindle support on its outside periphery and therefore has a compact construction in a radially outward direction.

Since the rotational mounting of the spindle support does not need to meet any high precision requirements during rotation thereof, the rotational mounting could be provided by an arm engaging over the spindle support, and not by the stand. This arm would not need to meet high stability requirements so long as the spindle support is additionally mounted on the stand, at least during machining of the work piece.

The concept of the invention is achieved in a particularly straightforward manner if the stand also supports the pivot bearing for the spindle support, and in particular the spindle support is mounted solely on the stand during its rotation.

It is particularly advantageous here if the spindle support is supported solely by the stand during machining of the work pieces, since the stand alone can be constructed particularly simply so that its mechanical behaviour can be overcome to attain high degrees of precision.

No further details have been given thus far regarding the arrangement of the rotary drive for the spindle support. This could be arranged at any desired location on the machine frame. For example, it would be possible to locate the rotary drive for the spindle support in the bottom part. However, the concept of the invention is carried out in a particularly straightforward way if the rotary drive for the spindle support is arranged on the stand, since this allows the spindle support to be driven in a simple manner as well as allowing the rotary drive to be housed in the "dead space" in which the spindle is also disposed.

A particularly favourable solution, especially for direct drive of the spindle support, provides that the rotary drive is arranged on a head of the stand.

In this case, it would be possible, for example, to house the rotary drive in the stand constructed as a hollow part.

However, it is particularly advantageous if the rotary drive is arranged on the head of the stand and extends beyond the head of the stand in the direction of the rotational axis. In this case, the rotary drive lies outside the stand and is therefore easily accessed for repairs, whilst on the other hand the stand can be designed with respect to its mechanical design without taking into account how the rotary drive is housed.

The rotary drive for the stand can be provided optionally by a direct drive, i.e. a direct connection of the spindle support to the drive motor. However, another advantageous solution using a gear provides that the gear is a single- or multi-step planetary gear, and its external gear rim is fixed to the spindle support. This planetary gear is exceptionally compact in the direction of the rotational axis and, moreover, permits the spindle support to be driven free from forces acting transversely to the rotational axis.

It has not been explained more closely in association with the above explanation of the individual embodiments where the tool should be disposed on the machine frame.

In principle, it is possible for the tool to also be disposed on the spindle support so that the tool is moved together with the work piece spindles.

However, since the multiple-spindle machine tool according to the invention must be loaded with work pieces, it is advantageous to interrupt the rotational movement of the spindle support in individual spindle stations. For this reason, it is also advantageous to dispose the tool on the machine frame in the individual spindle stations so that the work piece clamped by the work piece spindle standing in the corresponding spindle station is machined, when the spindle support is stationary in the individual spindle stations.

For example, it would be possible to provide a tool support on the stand for the tool. However, it is particularly advantageous if the bottom part holds a tool support for the tool, since this allows simple assembly of the tool support and a particularly dimensionally stable fixture thereof on the bottom part to the side of the stand.

A particularly expedient solution provides that the tool support is arranged on the external part of the bottom part, thus allowing the tool support to be assembled from outside the machine frame in an ergonomically favourable manner.

In principle, it would also be possible in the machine tool according to the invention to work with a stationary tool in the spindle station with a tool attached. However, it is particularly advantageous if the tool support can be moved radially to the spindle axis of the respective work piece spindle to allow the tool to be positioned in various positions relative to the work piece by suitable movement of the tool support with the tool.

A particularly expedient solution which in particular allows conventional rotational machining tasks to be carried out provides that the tool may be moved and positioned radially to the spindle axis of the work piece spindle standing in the respective spindle station by a numerically controlled X axis. It is possible here, for example, to carry out all simple turning machining tasks possible with an X axis when work piece spindles are rigidly connected to the spindle support.

A preferred feature in this regard is that the tool support sits on a carriage which may slide in the X axis, and this carriage can be moved along the X axis, e.g. with a spindle drive, in the usual manner for machine tools.

When the tool is disposed on the machine frame, it is preferred that the carriage sits on a carriage guide mounted on the bottom part, preferably on the external body thereof.

No further details have been given so far with respect to the arrangement of the work piece spindles in relation to the spindle support. In principle, the work piece spindles are arranged along their spindle axis so that they cannot be displaced relative to the machine frame. In order to provide a Z axis for machining the work piece, it would be possible to move the tool support with the tool relative to the work piece spindle in Z direction by a carriage system.

However, a particularly advantageous solution, at least for insertion of the work pieces into the work piece clamping means of the work piece spindles, is one in which the work piece spindles are linearly movable in the direction of their spindle axis to allow work pieces supplied on a feed unit to be directly gripped by the work piece clamping means.

It is of even greater advantage if the work piece spindles are already capable of such linear displacement that the work piece spindles displaceable in the direction of their spindle axes form a numerically controlled Z axis so that one axis is already provided for machining the work piece by the displaceability of the work piece. The advantage of this displaceability is that it enables work pieces to be produced with high cylindrical precision without the tool having to be moved additionally, and can at the same time by used to grip supplied work pieces directly.

To achieve as high a precision as possible during machining, it is advantageous if the work piece spindles are solely movable in the direction of their spindle axis, and not in several axes relative to the spindle support.

To provide the highest possible flexibility during machining of the work pieces, it is particularly advantageous if the work piece spindles are movable independently of one another relative to the spindle support in the direction of their spindle axis so that the movements can be with in the direction of the spindle axis with each individual work piece spindle in accordance with the task to be carried out.

This may be achieved particularly advantageously if each work piece spindle is equipped with its own linear drive to move it in the direction of the spindle axis.

For example, in a spindle support in which the work piece spindles can be positioned in different spindle stations, it would be possible to equip each spindle station with a linear drive fixed on the machine frame and to couple the work piece spindles in each spindle station thereto and to uncouple them again from the spindle support before shifting it further.

However, it is particularly advantageous with respect to machining precision and maximising flexibility of operation if each work piece spindle is constantly coupled to the linear drive.

Moreover, it is particularly expedient in this case if each work piece spindle can be positioned and fixed in a defined manner in the direction of the spindle axis by means of the linear drive so that no additional devices are required to fix the work piece spindles after positioning them in this position.

Such a multiple-spindle machine tool is constructed particularly advantageously when the linear drive sits on the spindle support and preferably comprises a drive motor which also sits on the spindle support.

An expedient provision here is that the linear drive is arranged on the spindle support to lie radially on the outside in relation to the respective work piece spindle. A particularly space-saving arrangement is one in which the linear drive is arranged in an angular area between two consecutive work piece spindles, wherein in particular the linear drive is spaced apart from two consecutive work piece spindles, i.e. essentially in the centre between them.

If high drive ratings are required, for example, the work piece spindles are fitted with a separate spindle drive, e.g. a drive motor flange-mounted behind them.

If the requirement is for the work piece spindle assembly to be as compact as possible, and therefore the whole unit comprising work piece spindles and spindle support must be relatively compact, it is particularly advantageous if each work piece spindle is constructed as a motor spindle since in this case the spindle drive can preferably be integrated into a sleeve of this spindle.

The feature that the working area is arranged around the stand means that the working area has non-adjoining or, even better, adjoining sections which are arranged around the stand.

No particular details have been given with respect to the structure of the working area in association with the previous explanation of the individual embodiments. Hence, a particularly advantageous embodiment provides that the working area comprises an area for movement of the work piece spindles which is enclosed and runs in a continuous ring around the stand. Such a working area enables the work piece spindles to be shifted on into the spindle stations without any problem.

In addition, an advantageous provision is that the working area comprises a chip forming area allocated to at least one spindle station, and the tool moves in this chip forming area, which is preferably constructed so that the chips formed therein can drop down due to gravity and be removed.

In addition, an advantageous solution provides that the working area comprises a loading and unloading area allocated to at least one spindle station in which a work piece is made available for insertion into the work piece spindle standing in this spindle station, or a work piece from a working spindle standing in this spindle station is taken up by a transport device and removed.

In order to avoid problems with the chips generated, in particular when the work piece is gripped by the work piece clamping chuck, especially in the case of adjacent chip forming areas and loading or unloading areas, a wall is preferably arranged between a chip forming area and a loading or unloading area.

An advantageous embodiment is expediently designed so that a wall is arranged between the chip forming area or loading or unloading area allocated to each spindle station.

The walls are provided preferably not only to separate these areas, but at the same time also provide support, and thus mechanical stability, for the stand.

Particularly good access to the working area is provided when the working area may be accessed from its outer side remote from the stand Unhindered by elements running from the spindle support to the bottom part for supporting the spindle support in order to prevent any hindrance as a result of such elements.

Moreover, an advantageous embodiment provides that the working area may be accessed by its outer side remote from the stand unhindered by elements running towards the bottom part for reinforcement of the stand relative to the bottom part, which also prevents any hindrance caused thereby to access to the working area.

For optimum removal of chips formed during machining, the bottom part preferably comprises a chip trough lying below the working area.

In this case, the bottom part is preferably constructed so that it has a chip trough extending below the working area and around the stand so that each of the spindle stations is joined to the chip trough, and in particular any chips or swarf or cleaning material may be removed from the individual areas allocated to the spindle stations.

No further details have been given with respect to the arrangement of the work piece spindles on the spindle support in association with the previous explanation of the individual embodiments. Hence, an advantageous embodiment provides that the work piece spindles are spaced with their spindle axes at the same respective distance from the rotational axis so that they lie on a circle around the rotational axis.

In addition, a preferred provision is that the work piece spindles are spaced with their spindle axes at constant angular distances around the rotational axis so that each of the work piece spindles can be brought into the next adjacent spindle station during rotation of the spindle support.

All the spindle axes are preferably arranged essentially parallel to the rotational axis of the spindle support and in particular at the same angle to this, in which case the spindle axes deviate from the parallel alignment to the rotational axis by a maximum of a few degrees, preferably less than 5 degrees.

An additional, preferred provision is that the rotational axis of the spindle support runs essentially vertically, i.e. essentially encloses an angle of less than 20 degrees with the vertical.

A particularly advantageous embodiment provides that the spindle axes run parallel to one another and parallel to the rotational axis, in which case the rotational axis expediently runs vertically.

No further details have been given with respect to the construction of the individual spindle stations in association with the above explanation of the individual embodiments. Hence, an advantageous embodiment provides that at least some of the spindle stations are constructed as machining stations. However, it is also possible for all the spindle stations to be constructed as machining stations. In this case, the work piece must be inserted and removed at least one of the machining stations in addition to machining.

Another advantageous embodiment of the solution according to the invention is that at least some of the spindle stations are constructed as loading and unloading stations, and these are preferably spindle stations solely constructed as loading or unloading stations. This embodiment permits a particularly simple supply of work pieces, e.g. on a horizontal conveyor, in particular in conjunction with work piece spindles which may be moved linearly in the longitudinal direction of the spindle axis.

It is particularly advantageous if the work pieces in the spindle position centred to the spindle axis are made available to be gripped by the work piece clamping chuck.

No further explanations have been provided with respect to the rotational mobility of the spindle support. For example, it would be possible to allow the spindle support to continue to rotate in the same direction—like in conventional automatic multiple-spindle turning machines—so that each of the work piece spindles passes cyclically through all the spindle stations.

However, it has proved advantageous with respect to the supply of the spindles arranged on the spindle support if the spindle support may be rotated from a starting position about a maximum angle in one direction as far as an end position and then in the opposite direction back into the starting position again, and a flexible supply assembly following the rotational movement around the maximum angle is guided from the machine frame to the spindle support. The advantage of this solution is that the rotational feeds known from the prior art can be dispensed with in the supply of work piece spindles so that none of the problems associated with such rotational feeds occur. Instead, optimum operation of the work piece spindles is possible, e.g. also during further rotation of the spindle support, as a result of the constant connection with supply and control means by means of the flexible supply assembly.

The spindle support can preferably be rotated about a maximum angle which corresponds to an integral multiple of 360°, divided by the total number of spindle positions.

The object mentioned at the beginning is additionally achieved according to the invention with a multiple-spindle machine tool as mentioned above in that the machine frame comprises a bottom part standing on the base, starting from which support elements lying in planes running radially to the rotational axis and running through this extend upwards, said support elements extending as far as the support ring and supporting this; that the support ring supports the spindle support; that the work piece spindles are arranged in their spindle positions around the rotational axis; and that a working area for machining the work pieces held in the work piece spindles is arranged radially inside the support elements around the rotational axis.

The advantage of this solution is also that the machine frame is of a compact structure as well as there being optimum use of space with good access to the work piece spindles and tools.

Access to the work piece spindles and tools is particularly good when the support elements are formed from parts extending over the surface in the planes so that their extension is kept as low as possible in the azimuthal direction with high stability.

This can be achieved particularly advantageously in that the support elements extend radially outwards from a circular path of the work piece spindles so that inside the support elements a working area is provided, in which the work piece spindles can move unhindered.

A particularly expedient arrangement provides that the support elements are constructed as supporting walls.

To achieve as stable a construction as possible, it is preferably provided that the number of stations in the working area in which the work piece spindles may be positioned corresponds to the number of work piece spindles and that the support elements are respectively arranged between two consecutive stations.

In this case, the support elements can be arranged as desired so long as they stand between consecutive stations. It is particularly expedient in this case if the support elements are spaced at equal angular distances from one another so that the machine frame, in particular the support elements together with the support ring, behaves as symmetrically as possible in the case of changing temperature and occurring stresses.

The number of support elements can be fundamentally as desired. However, it is particularly advantageous if at least three support elements are provided.

A particularly advantageous solution provides that one of the support elements is arranged between each two consecutive stations so that the number of support elements ultimately corresponds to the number of stations provided for the work piece spindles.

No further details have so far been given with respect to the structure of the support elements. Hence, a particularly advantageous structural solution for the machine frame provides that the support elements with the support ring extend upwards above the bottom part unsupported, thus forming an intrinsically rigid unit sitting on the bottom part.

9

In this case, it is also preferred that the bottom part comprises an external part, which extends as far as the support elements, runs around the rotational axis and is supported on the base.

In this case, it is expedient if the support elements are connected to the external part, in which case a detachable connection preferably exists between the support elements and the external part.

No further details have been given so far with respect to the mounting of the spindle support in association with this solution. Hence, an advantageous embodiment provides that the spindle support is rotatably mounted via a bearing which lies radially outside the paths the work piece spindles follow during rotation of the spindle support.

In this case, the support ring preferably supports the bearing for the spindle support.

It is of particular advantage for high precision of the machine during machining if the spindle support is supported solely by the support ring in a machining position for machining the work pieces, since—as disclosed in particular with respect to the embodiments explained above—the support ring is connected as rigidly as possible to the bottom part and exhibits an advantageous response to temperature and stress, in particular a behaviour symmetrical to the rotational axis.

Purely on principle, the rotary drive for the spindle support could be arranged separately. However, it is particularly advantageous if the rotary drive for the spindle support is also arranged on the support ring.

In this case, the rotary drive could be arranged on any desired sides of the support ring. However, it is particularly advantageous to provide optimum access to the working area if the rotary drive is arranged on the support ring and extends beyond the support ring in the direction of the rotational axis.

The spindle support could be mounted in a variety of ways. It is particularly advantageous if the support ring engages on the spindle support on an outer side to assure as stable a support of the spindle support as possible.

To additionally permit a favourable arrangement for the elements required for mounting the spindle support, and also provide sufficient clearance below the spindle support for undisturbed access to the working area, the support ring advantageously surrounds the spindle support on one side of the outer periphery.

Further advantageous embodiments of this concept of the invention have the same features as the embodiments of the above-described concept, in particular with respect to the arrangement and displaceability of the work piece spindles relative to the spindle support and the arrangement and mobility of the tools and work piece feed and removal means.

Further features and advantages of the invention are the subject of the following description as well as of the drawing showing some embodiments.

10

Figure 1:
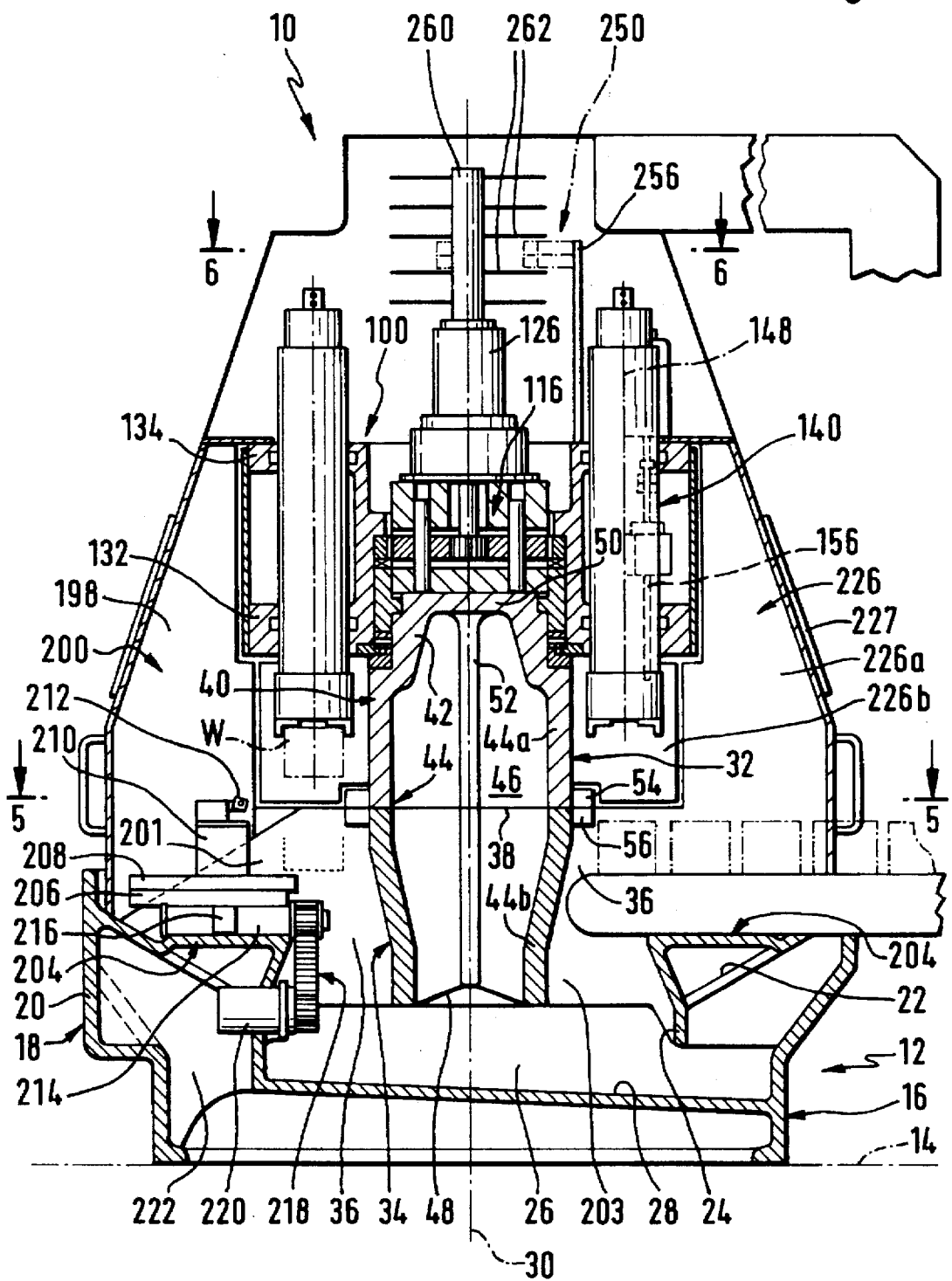
FIG. 1 is a side view of a vertical section through a first embodiment of a multiple-spindle machine tool according to the invention.
Figure 5:
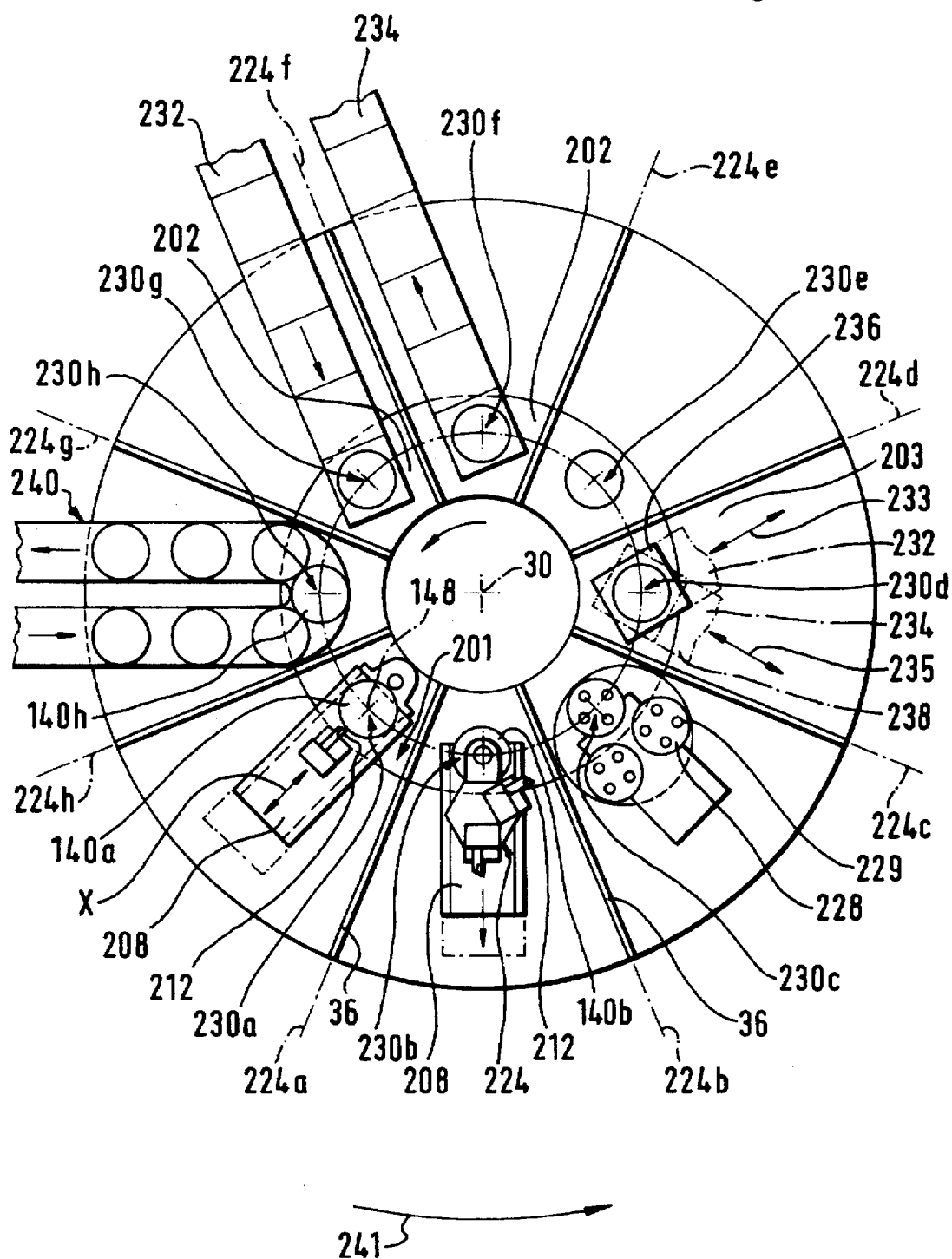
Figure 6:
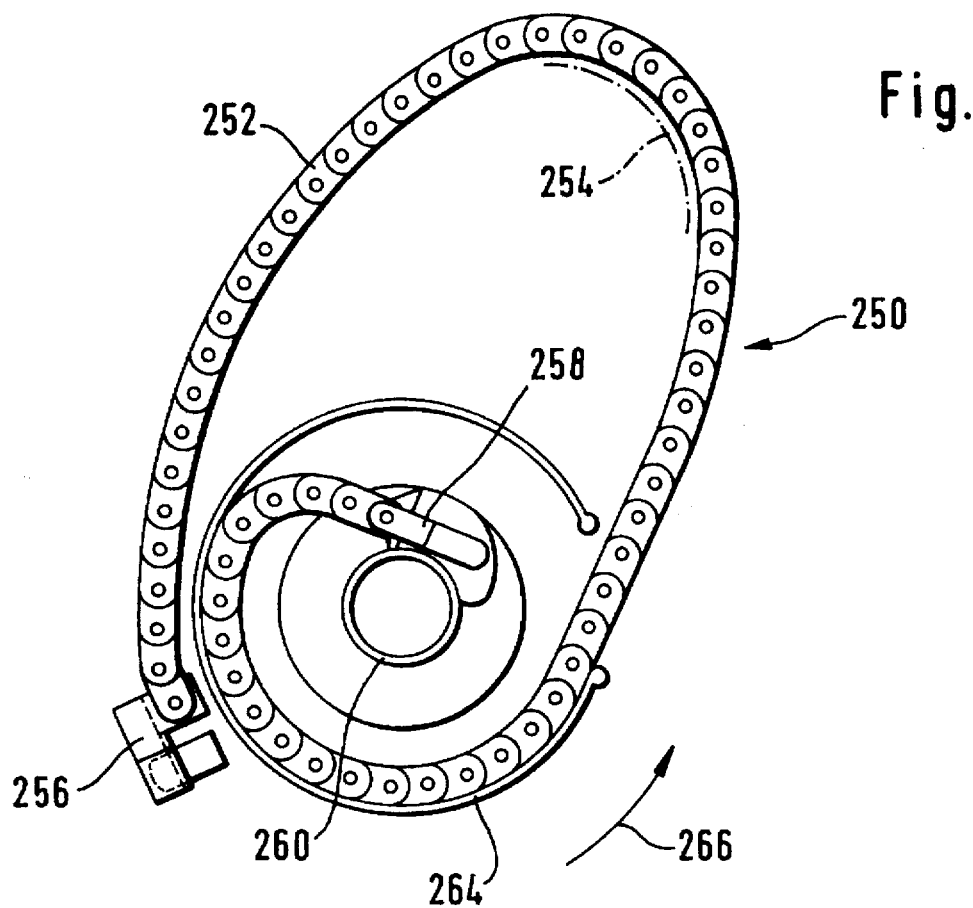
Figure 7:
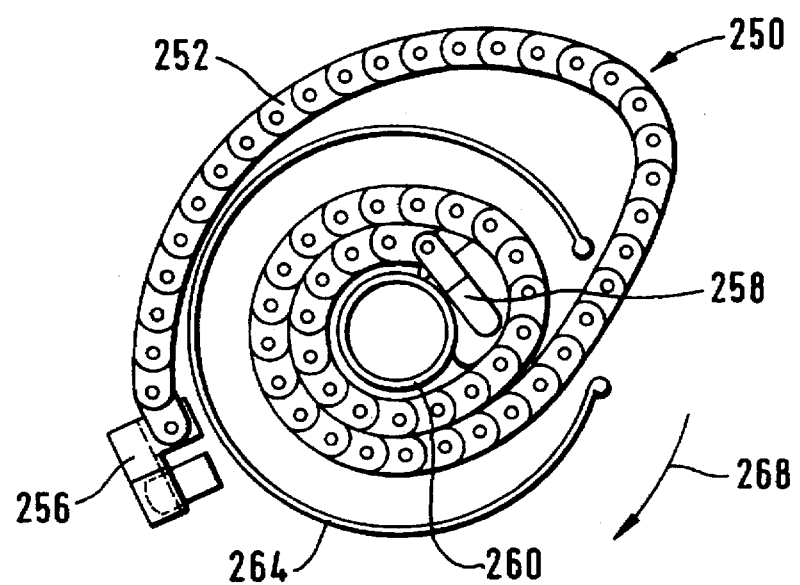
Figure 8:
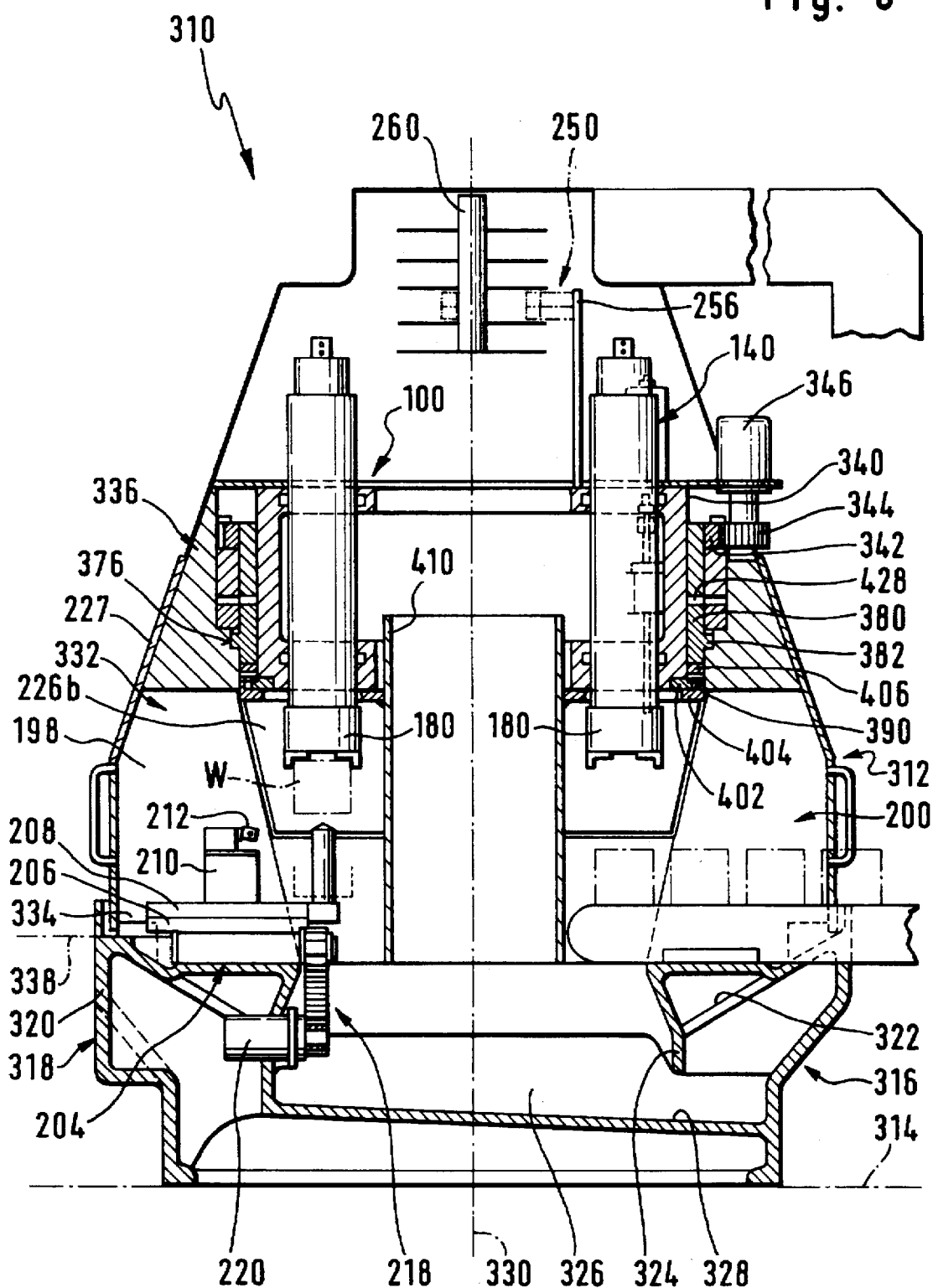
Figure 9:
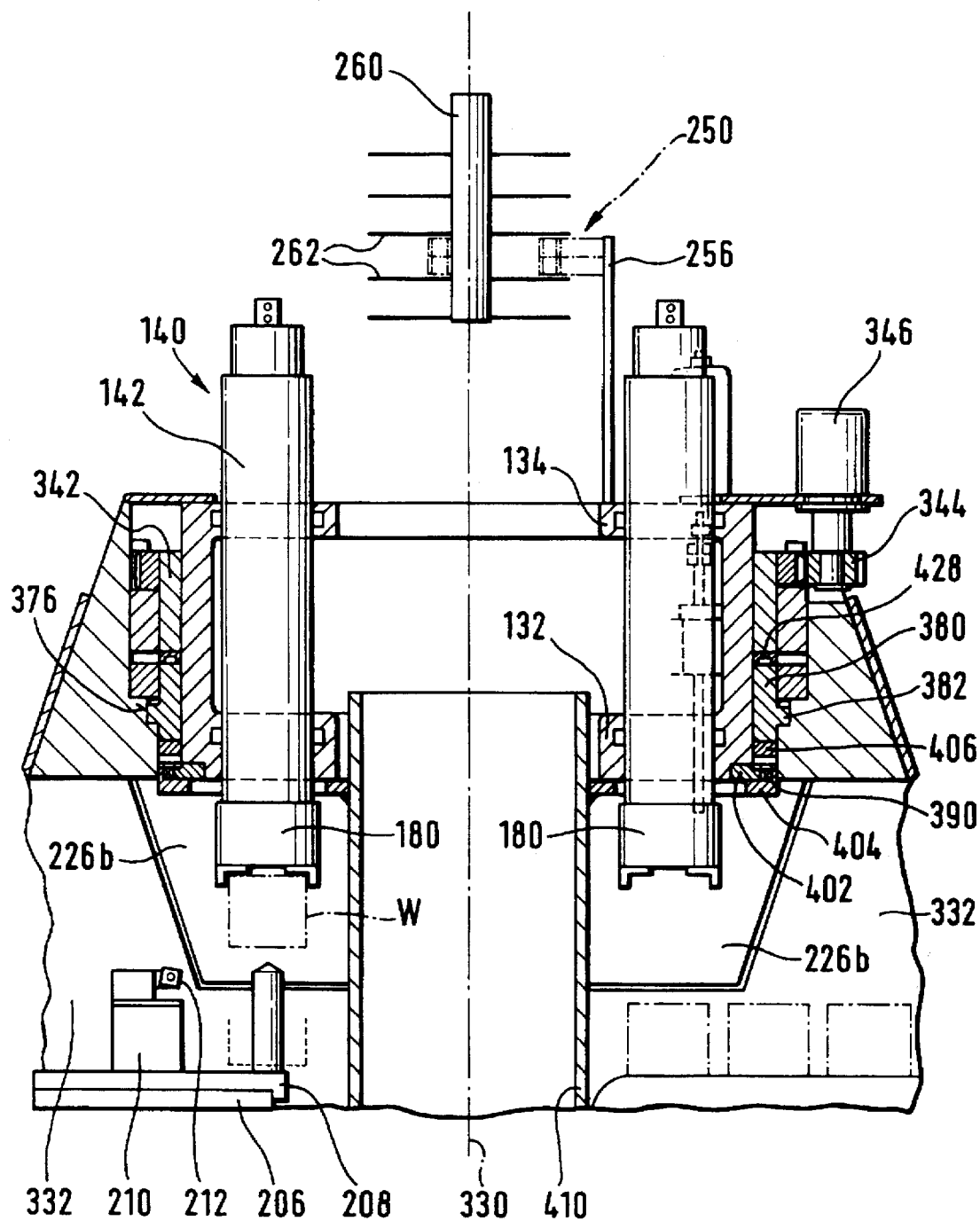

FIG. 5 shows a section along line 5—5 in FIG. 1;

FIG. 6 is a top view of a section along line 6—6 in FIG. 1 onto a flexible supply assembly in its starting position;

FIG. 7 shows a section similar to that in FIG. 6 with the supply assembly in its end position after rotation around 315°;

FIG. 8 is a side view of a vertical section similar to that in FIG. 1 through a second embodiment of a multiple-spindle machine tool according to the invention; and FIG. 9 is an enlarged sectional view of the section in FIG. 8 in the area of a support ring.

DETAILED DESCRIPTION OF THE INVENTION

A first embodiment of a multiple-spindle machine tool according to the invention, given the overall reference 10 in FIG. 1, comprises a machine frame 12 with a bottom part 16 standing on a base 14. This bottom part 16 has an outer ring body 18 with a cylindrical outside wall 20 as well as a run-off wall 22 sloping down from this towards the inside. On its inner side remote from the outside wall 20, the run-off wall 22 terminates with an inner ring wall 24 which encloses an opening of a chip collecting trough, given the overall reference 26, said chip collecting trough having a base 28 running on an incline in a transverse direction.

The outer ring body 18 is preferably symmetric, in particular rotationally symmetric, to a central axis 30, said central axis 30 standing perpendicular on the base 14 and passing through it.

A stand, given the overall reference 32, is arranged around the central axis 30 and extends over the chip collecting trough 26 away from the bottom part 16 along the central axis 30. The stand 32 comprises a foot 34 which is supported by a supporting wall 36 extending from this foot 34 and running radially to the central axis 30 in the direction of the ring body 18 and supported on the run-off wall 22.

The foot 34 of the stand, together with the supporting walls 36 and the ring body 18, preferably forms an integral part made from a single piece of the same material.

The foot 34 of the stand is separated by a dividing plane 38, which preferably runs parallel to the base 14, from an upper part 40 of the stand, with which the stand 32 continues to extend unsupported in the direction of the central axis away from the bottom part 16 and as far as a head 42 of the stand.

According to the invention, the stand 32 comprises a stand tube 44, which surrounds an inner hollow area 46, opens downwards to the chip collecting trough 26 via an opening 48 and is closed at the top by a head plate 50 arranged on the head 42 of the stand.

For reinforcement of the stand tube 44, it is also provided with ribs 52 extending from it and protruding into the hollow area 46.

The upper part 40 of the stand with the head 42 of the stand is connected to the foot 34 of the stand in the area of the dividing plane 38 by means of mounting lugs 54, which are held on the upper part 40 of the stand and protrude outwards over the stand tube 44, and which may be connected, e.g. by means of screws, to corresponding mounting lugs 56, preferably disposed on the stand tube 44 of the foot 34 of the stand and on the supporting walls 36. The stand tube 44a of the upper part 40 of the stand additionally sits on the stand tube 44b of the foot 34 of the stand.

Figure 2:
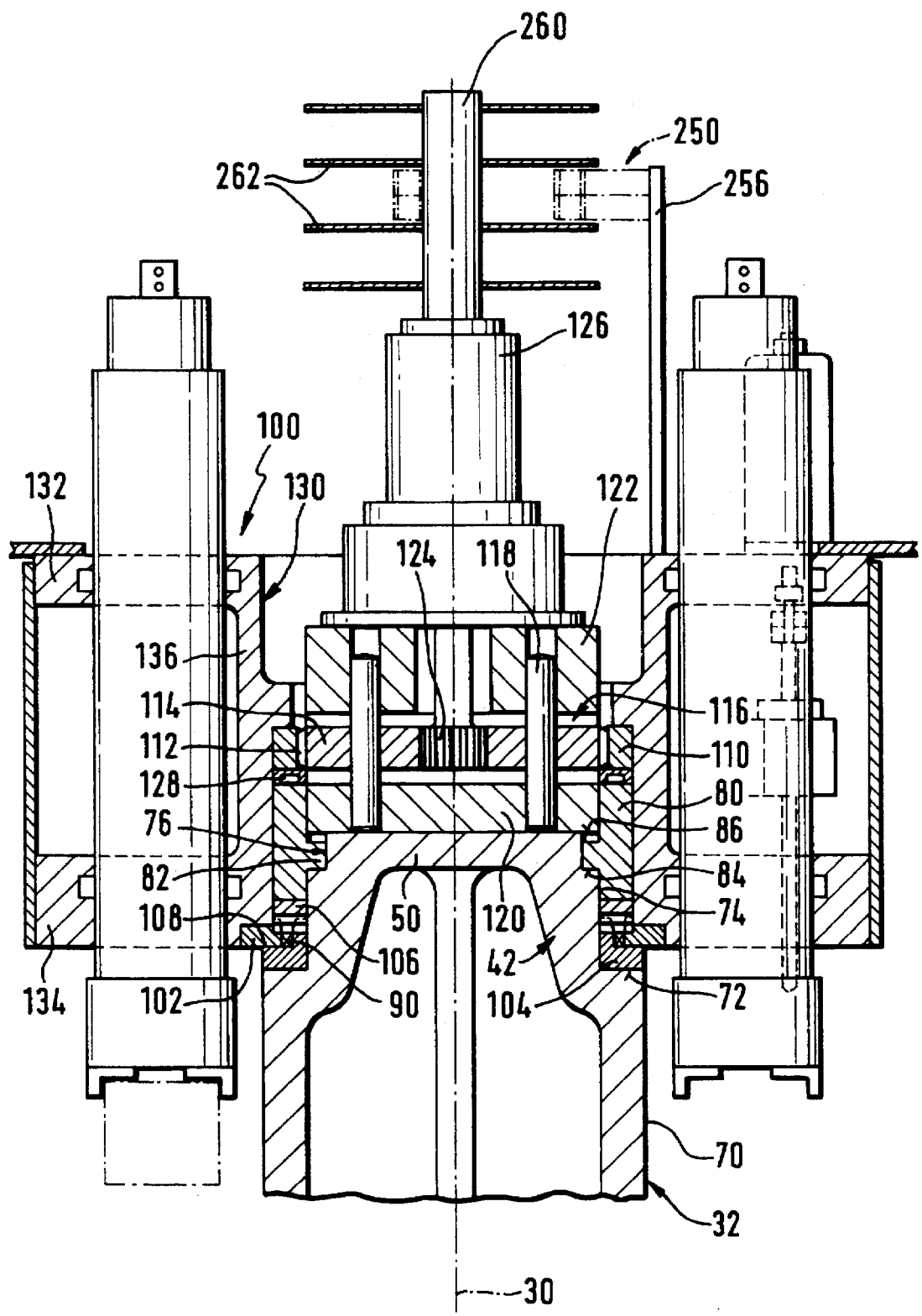
FIG. 2 is an enlarged view of the section in FIG. 1 in the area of a head of the stand.

As is shown in an enlarged view in FIG. 2, the head 42 of the stand is provided with a step formed by an annular flange facing 72, which extends radially inwards from an outer surface area 70 of the stand tube 44, and a cylinder surface 74 adjoining said flange facing and set back radially relative to the outer surface area 70, in which case the cylinder surface extends in the direction of the head plate 50 as far as an annular groove 76 arranged in the area of the head plate 50.

A sleeve, given the overall reference 80, is arranged on the cylinder surface 74, said sleeve having an annular piston 82 moulded onto it, which engages into the annular groove 76 and may be moved between two groove walls 84 and 86 of the annular groove 76 extending radially to the central axis 30, thus defining a respective cylindrical area located between the annular piston 82 and the respective groove wall 84 or 86. By subjecting one cylindrical area or the other to pressure, the annular piston 82, and therefore the sleeve 80, may be displaced relative to the head 42 of the stand in a direction parallel to the central axis 30.

A spindle drum (e.g., support), given the overall reference 100, is mounted on the sleeve 80 by means of a radial bearing 90 arranged between rings 102 and 104 of a serration so as to rotate about the central axis 30 as rotational axis. The spindle drum 100 is additionally connected to a first ring 102 of the serration connected to it non-rotatably, said first ring being mounted on the second ring 104 of the serration which is connected non-rotatably to the head 42 of the stand and may be rotated relative to said second ring. In this case, both rings 102 and 104 are provided with rows of teeth running radially to the central axis 30 and pointing in the direction of the sleeve 80, and into said rows of teeth a row of teeth of a third ring 106 fixed to the sleeve 80 may be brought into engagement, the three rings 102, 104 and 106 jointly forming the three-part serration.

In order to fix the second ring 104 of the serration, which is connected non-rotatably to the head 42 of the stand, in the direction of the central axis 30, this ring is preferably supported directly on the flange facing 72 and is likewise centred on the cylindrical surface 74 in radial direction.

The three rings 102, 104 and 106 of the serration may thus be brought into engagement with one another by pressing the third ring 106 with its toothing in to the toothing arrangements of the first and second ring 102, 104 by means of the sleeve 80. At the same time, the first ring 102 is supported on the second ring 104 on a flange-like support surface 108 so that the spindle drum 100 may not only be fixed non-rotatably relative to the head 42 of the stand overall by the three-part serration by means of rings 102, 104 and 106, but is also precisely fixed in its position in a direction parallel to the central axis 30.

By moving the sleeve 80 and the third ring 106 of the serration connected to it away from the first and second ring 102, 104, the serration, and therefore the non-rotatable fixture of the spindle drum 100, may be separated so that the spindle drum 100 may rotate relative to the sleeve 80 about the central axis 30 as rotational axis.

To drive the rotational movement of the spindle drum 100, this is fitted with a gear rim 110 with internal toothing 112, said gear rim 110 being arranged on a side of the sleeve 80 opposite the serration 102, 104, 106 and nonrotatably connected to the spindle drum 100.

This gear rim 110 may be driven by planet wheels 114 of a planetary gear, given the overall reference 116, in which case the planet wheels 114 sit on axes 118 which are firmly anchored at one end in a bottom housing plate 120 lying directly on the head plate 50 so as to be non-rotatable and at the other end in a top housing plate 122 so as to be non-rotatable, and thus maintain the housing plates 120 and 122 at a defined distance from one another with the planet wheels 114 lying in recesses in one of the housing plates 120 and 122.

The planet wheels 114 may be driven by a central pinion 124 which sits directly on a drive shaft of a drive 126, which is fixed to the top housing plate 122 and passes through this with its drive shaft.

By driving the three planet wheels 114 by means of the pinion 124, which is flexibly movable in radial direction, the gear rim 110 may be driven free from transverse forces relative to the central axis 30 via the planet wheels 114 engaging into the internal toothing 112.

In order to separate the first ring 102 from the support surface 108 of the second ring 104 of the serration during rotation of the spindle drum 100 by movement likewise in the direction of the central axis 30, an axial bearing 128 is arranged between the sleeve 80 and the gear rim 110 to enable movement of the spindle drum 100 together with the first ring 102 in the direction of the central axis 30 so that the first ring 102 lifts minimally from the second ring 104 of the serration. In this state, the spindle drum 100 is mounted only via the axial bearing 128 relative to the sleeve 80 and the radial bearing 90 is mounted relative to the head 42 of the stand, whereas in the non-rotatable state the axial bearing 128 and the radial bearing 90 are without effect and the spindle drum 100 is fixed and exactly positioned relative to the stand 32 only via the three rings 102, 104 and 106 of the serration.

Figure 3:
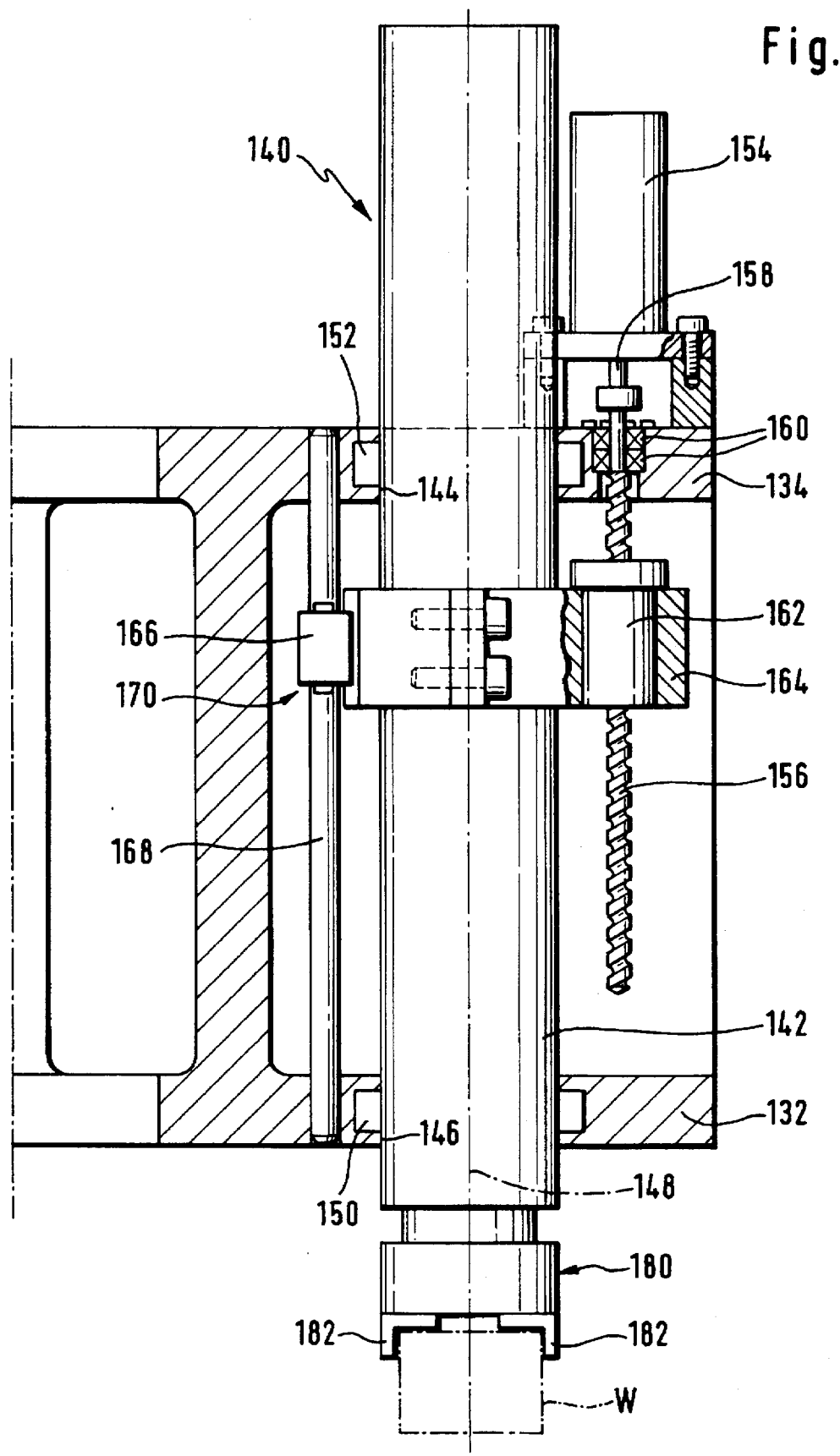
FIG. 3 is an enlarged view of the section in FIG. 1 in the area of a spindle.

The spindle drum 100 comprises a support body 130 with two support flanges 132 and 134, which are arranged at a distance from one another and protrude radially outwards from an inside cylinder 136 extending between them, forming an integral part with this inside cylinder (FIGS. 2 and 3).

Several, e.g. eight, spindles 140 are arranged on the support body 130 respectively at equal radial distances from the rotational axis or central axis 30 and in constant angular distances relative to the rotational axis 30, said spindles 140 passing with their sleeves 142 through sleeve passages 144 or 146 in the support flanges 132, 134.

In this case, the spindles 140 are aligned with their spindle axes 148, as shown in FIG. 3, so that these run parallel to the rotational axis 30. Additionally, to make a Z axis movement relative to the spindle drum 100 in the direction of their spindle axes 148, the spindle sleeves 142 are supported on the support flanges 132 and 134 so that they can be linearly displaced by means of linear guides 150 or 152 sitting in the support flanges 132 and 134.

For linear movement of the spindle sleeves 142 in the direction of their spindle axes 148, a Z axis drive motor 154 is provided (FIG. 3) which drives a ball threaded spindle 156 aligned parallel to the spindle axis 148 and mounted both radially and axially in the support flange 134 by means of a bearing 160 on one ball threaded end, e.g. in the area of the connection with an output shaft 158 of the drive motor 154.

The ball threaded spindle 156 preferably extends with its spindle section between the two support flanges 132 and 134 adjacent to the spindle sleeve 142, and the drive motor 154 is arranged on a side of the support flange 134 opposite the ball threaded spindle 156, likewise adjacent to the spindle sleeve 142, and is held on the support flange 134. Hence, a ball threaded nut 162 also lies between the two support flanges 132 and 134. This also sits in a holder 164, which is fixed to the spindle sleeve 142 and extends from the spindle sleeve 142 in the direction of the ball threaded nut 162, and preferably receives this via an opening. In addition, the holder 164 preferably encloses the spindle sleeve 142 and supports a guide body 166 which is guided on a linear guide element 168, preferably a guide rod extending parallel to the spindle axis 148 and to the rotational axis 30, said guide body 166 together with the linear guide element 168 constituting an anti-twist arrangement 170 for the spindle sleeve 142 which is linearly movable in the direction of the spindle axis 148 so that the ball threaded spindle 156 runs free from transverse forces in the ball threaded nut 162.

Each work piece spindle 140 comprises a work piece clamping means, e.g. one forming a work piece clamping chuck 180, which is arranged to face the bottom part 16 and is mounted in the spindle sleeve 142 to rotate around the spindle axis 148, said work piece clamping chuck 180 comprising clamping jaws 182 (FIG. 4) for clamping a work piece W. This work piece clamping chuck 180 sits on a spindle tube 184, which is itself rotatably mounted via radial bearings 186 in the spindle sleeve 142, and via a rotor 188, which, together with a stator 190 fixed in the spindle sleeve 142, preferably in an area thereof lying opposite the work piece clamping chuck 180, forms a built-in motor, given the overall reference 192, for rotational drive of the work piece clamping chuck 180.

Figure 4:
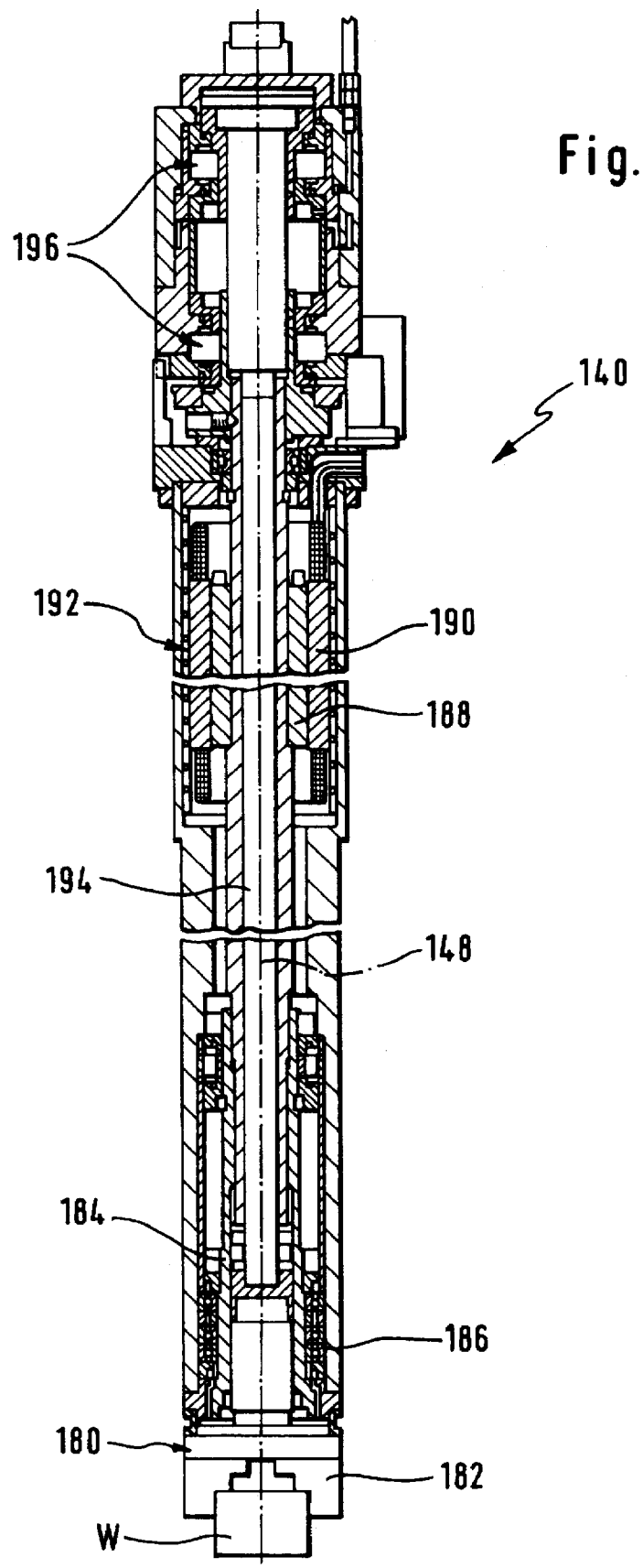
FIG. 4 shows a longitudinal section through a spindle of the first embodiment.

Moreover, for operation of the work piece clamping chuck 180, a further clamping tube 194 passing through clamping tube 184 is provided which extends through the spindle tube 184 and through the rotor 188, and leads to a hydraulic clamping cylinder 196 which is arranged at an end of the spindle sleeve 142 lying opposite the clamping chuck 180. The work piece clamping chuck 180 may be operated with this hydraulic clamping cylinder 196 in the usual manner (FIG. 4).

As is shown in FIG. 1, the work piece clamping chucks 180 are arranged on the side of the spindle drum 100 facing the bottom part 16 so that they protrude into an upper section 198 of a working area 200 which runs around the stand 32 in the form of a closed ring. As shown in FIGS. 1 and 5, the working area 200 additionally comprises further chip forming areas 201 and loading or unloading areas 202, or also loading and unloading areas 203 lying partially below the upper section 98 and protruding into the bottom part 16 so that the bottom part 16 of the working area 200 also encloses these sections.

For machining work pieces W clamped in the work piece clamping chucks 180 in the working area 200, carriage guides 206 with carriages 208 arranged on them are provided on support benches 204 constructed on the bottom part, said carriages supporting tool supports 210 with tools 212. As shown in FIG. 5, the carriages 208 may be moved in radial direction to the spindle axis 148 of a work piece spindle 140 standing in a machining station allocated to this tool 212.

In this case, the support benches 204 are preferably moulded from the run-off wall 22 to form one piece.

In order to drive the carriage 208 relative to the carriage guides 206, a ball threaded spindle 214 is preferably provided below the respective carriage 208 and has a ball threaded nut 216 sitting on it. The ball threaded spindle 214 is in turn connected via a gear 218 to an axle drive motor 220 which is preferably arranged underneath the support bench 204 on the side thereof lying opposite the carriage guide 206, and projects into a cavity 222 enclosed by the ring body 18 with the outside wall 20 of the run-off wall 22 or the support benches 204 as well as the ring wall 24.

The chip forming areas 201 and the loading or unloading areas 202, 203 are each provided singly on the machine frame and are allocated to spindle stations 230 corresponding to the number of work piece spindles, and, since they protrude into the bottom part 16, are separated by the supporting walls 36 lying respectively in planes 224 running through the central axis 30 and respectively lying centrally, i.e. on the angle bisecting line, between two consecutive spindle stations 230. The supporting walls 36 preferably run at the same angular distance from one another and their number corresponds to the number of spindle stations 230 (FIG. 5).

The upper section 198 is provided with chip protection walls 226 which stand in the same planes 224 as supporting walls 36 if the spindle support 100 positions the work piece spindle 140 in the spindle stations 230. The chip protection walls 226 are divided into chip protection wall elements 226a fixed on the machine frame 12 and mobile chip protection wall elements 226b, which are held on the spindle support 100 and may be moved with this, and which combine to form the chip protection wall 226 extending essentially from the stand 32 to an outer working area cover 227.

As is shown in FIG. 5, it is possible with the work piece spindle 140a standing in a first spindle station 230a, for example, to carry out machining of the work piece W by moving the work piece spindle 140a with the Z axis in Z direction and by moving the tool 212 with the X axis in X direction, in which case the machining is carried out in the chip forming area 201 So that the chips and the swarf pass directly into the chip collecting trough 26 from the chip forming area 201 open at the bottom to the chip collecting trough 26 by the action of gravity.

Machining also occurs, for example, with the work piece spindle 140b standing in the next adjacent spindle station 230b, in which case a tool revolving means 225 with several tools 212 is arranged on the carriage 208.

It is also possible to machine the work piece W held in the work piece spindle 140c, for example, in the next following spindle station 230c, i.e. by exchangeable drilling tools 229 arranged on a multiple drilling head 228.

No machining is provided for in the next following spindle station 230d, for example, the work piece W is instead inserted or removed into or from the work piece spindle 140d in the loading and unloading area 203. For this purpose, a work piece supply belt 232 and a work piece discharge belt 234 are provided which may each be moved linearly in transport direction 233 or 235 as a whole so that either the work piece supply belt 232 with its end 236 is in the position to make a work piece W standing on this belt available for gripping by the work piece clamping chuck 180 of the work piece spindle 140d, centred and aligned parallel to the spindle axis 148 thereof, or the work piece transport belt 234 with its end 238 is in the position to receive a work piece W from the work piece clamping chuck 180 of the work piece spindle 140.

As an alternative to the supply and discharge of work pieces via the work piece transport belts 232 and 234, as shown in spindle stations 230f and 230g, for example, a single work piece supply belt 232 or work piece discharge belt 234 is provided for each of the spindle stations, said belt running into the respective loading or unloading area 202 to take up or supply a work piece W from the work clamping chuck 180 in the corresponding spindle station 230f or 230g and make it available for gripping by the work piece clamping chuck 180. With a further eighth spindle station 230h a circulating work piece supply means 240 is shown by way of example, which can receive a work piece W from the work piece clamping chuck 180 of the work piece spindle 140h standing in this spindle station 230h in the loading or unloading area 203, or can make a work piece available for gripping by the work piece clamping chuck 180.

The individual work piece spindles 140a to 140h may be brought into the next respective spindle station 230b to 230a by shifting the spindle drum 100 further around a spindle station, and may be brought into the next spindle station 230c to 230b by shifting the spindle drum 100 one spindle station further so that the work piece inserted in a spindle station, e.g. 230h, can be successively machined in the following spindle stations 230a to 230c and can, for example, be removed in spindle station 230d. At the same time, the supply of a further work piece is possible in spindle station 230d and said work piece can, for example, also be machined in spindle station 230e.

In the multiple-spindle machine tool according to the invention, it is possible to shift the work pieces on in one direction of rotation, e.g. as marked by arrow 241.

However, a plurality of supply and control lines must be directed to the spindle drum, because there is a total of eight work piece spindles 140 arranged on the spindle drum 100 in the solution of the invention, each of which spindles can be displaced with the Z axis drive along the Z axis and with which the work piece clamping chuck 180 can be respectively driven by means of the built-in motor 192.

This is achieved advantageously, as shown in FIGS. 1, 6 and 7, by a supply assembly 250 which has a flexible segment chain 252 and flexible supply lines 254 directed on this. The supply assembly 250 is fixed at one end 256 to the spindle drum 100 and at an opposite end 258 to a non-rotatable support tube 260, which—as shown in FIG. 1—extends coaxially to the rotational axis 30 as a continuation of the drive motor 126 on its side opposite the planetary gear 116. Guide discs 262 running in planes perpendicular to the rotational axis 30 are additionally arranged on this support tube 260 at constant distances from one another, the supply assembly 250 being directed horizontally between two such guide discs 262. In addition, the supply assembly 250 is directed in a worm casing 264 shown in FIGS. 6 and 7, which surrounds the support tube 260 while being rotatable jointly with the spindle drum 100 about the axis 30.

When the supply assembly 250 is used, for example, in the case of eight spindle stations 230a to h, a rotation of the spindle drum 100 about a maximum angle of rotation of 360°–45° is permitted at a respective angular distance of 45°. If the spindle drum 100 rotates out of the starting position shown in FIG. 6, for example, in the direction of arrow 266, then end 256 and casing 264 rotate in this direction, in which case the supply assembly 250 winds in a spiral around the support tube 260 with the end 258 fixed thereto, and in an end position stands in the position shown in FIG. 7. If the spindle drum 100 rotates back in the direction of arrow 268, as shown in FIG. 7, then the supply assembly 250 wound in a spiral around the support tube 260 winds up again and stands in the starting position shown in FIG. 6 after rotating around 360°.

By constantly rotating back and forth around the maximum angle of 360°–45°, therefore, it is possible to constantly supply the work piece spindles 140 with energy and control data via the flexible supply assembly 250 and monitor them, irrespective of whether they stand in a spindle station or are moved from one spindle station to the next.

The multiple-spindle machine tool according to the invention preferably operates so that it runs through a work cycle, e.g. at a maximum angle of 360°–45°, so that the work piece spindles 140a, for example, run through each of the individual spindle stations 230a to 230h during their rotational movement along arrow 266, in which case either machining or loading and unloading or both occurs, and the work piece spindle 140a ultimately stands in spindle station 230h again.

Rapid return rotation about an angle of 360°–45° follows this so that the work piece spindle 140a stands in the spindle position 230a again without approaching each of the individual spindle positions 230g to 230b or machining or loading and unloading being carried in this.

As an alternative to this, however, it is also possible to approach each of the individual spindle stations 230g to 230b again on return rotation by 360° in the direction of arrow 268 and to likewise carry out machining or loading and unloading operations, or both.

A second embodiment of a multiple-spindle machine tool according to the invention, given the overall reference 310 in FIG. 8, comprises a machine frame 312 with a bottom part 316 standing on a base 314.

This bottom part 316 has an outer ring body 318 with a cylindrical outside wall 320 as well as a run-off wall 322 sloping down from this towards the inside. On its inner side remote from the outside wall 320, the run-off wall 322 terminates with an inner ring wall 324 which encloses an opening of a chip collecting trough, given the overall reference 326, said chip collecting trough having a base 328 running on an incline in a transverse direction.

The outer ring body 318 is preferably symmetric, in particular rotationally symmetric, to a central axis 330, said central axis 330 standing perpendicular on the base 314 and passing through it.

Starting from the bottom part 316, in particular the ring body 318, supporting walls 332 lying in planes 224 already described in conjunction with the first embodiment extend from a foot 334 sitting on the ring body 318 to a support ring 336, on which the spindle drum 100 is mounted to rotate about the central axis 330.

In this case, the supporting walls 332 form an integral part of the machine frame 312 which is attached onto the bottom part 316 and connected thereto, and separated from the bottom part 316 by a dividing plane 338.

In this case, the support ring 336 encloses the spindle drum 100 in the area of its outer periphery 340. A gear rim 342 is provided on the outer periphery of the spindle drum 100, and a pinion 344 of a drive 346 held on the support ring 336 engages into said gear rim, this drive 346 being constructed as a numerically controlled axle drive.

Moreover, a sleeve 380 is provided on the support ring 336, said sleeve engaging with an annular piston 382 into an annular groove 376 forming a cylinder area so that the sleeve 380 may be displaced parallel to the central axis 330 by the annular piston 382 in the same way as sleeve 80 is displaced by annular piston 82.

A three-part serration is also provided for positioning the spindle drum 100 and is provided with a ring 402, which is fixed on the Spindle drum and has a toothing arrangement facing the sleeve 380, as well as a ring 404 fixed on the support ring 336 which likewise has a toothing arrangement facing the sleeve 380, and between both rings 402 and 404 a radial bearing 390 is provided for radial support of the spindle drum 100 on the support ring 336.

In addition, the sleeve 380 is provided with a third ring 406 with a toothing arrangement which faces the toothing arrangements of rings 402 and 404 and may be brought into engagement with this by movement of the sleeve 380.

In conjunction with this, reference is made to the detailed description of the function of the serration formed by rings 102, 104 and 106 in cooperation with the sleeve 80 in the first embodiment.

In addition, an axial bearing 428 is provided between the sleeve 380 and the gear rim 342 which acts in the same way as axial bearing 128 to lift the entire spindle drum 100 when the serration is separated in order to rotate rings 402 and 404 relative to one another without friction—as has already been described in conjunction with the first embodiment.

To sub-divide the upper section 198 of the working area 200, the support walls 332 extend from the outer working area cover 227 to the chip protection wall elements 226b held on the spindle support 100 so that the support walls 332 at the same time assume the function of chip protection wall elements 226a described in the first embodiment.

An inner cylinder 410 is additionally provided to define the working area 200 in the direction of the central axis 330 and protects against coolant and chips being distributed in the sections of the area.

Otherwise, the second embodiment is constructed in the same way as the first embodiment, and therefore for the description of the other parts reference is made to the full explanations for the first embodiment.

What is claimed is:

1. A multi-spindle machine tool comprising:

a machine frame which rises above a base;

said machine frame comprising a bottom part standing on the base;

said machine frame further comprising a stand extending upwards from said bottom part;

said bottom part extending radially beyond said stand;

a spindle support supported by said stand;

said spindle support being rotatable about a rotational axis extending upwardly from said base;

a plurality of workpiece spindles arranged on said spindle support around said rotational axis in individual spindle positions;

said spindle support being rotatable for positioning said workpiece spindles in different spindle stations of said machine frame and said spindle support maintaining said workpiece spindles in a fixed position with respect to said frame for performing machining operations in said spindle stations;

each of said workpiece spindles being individually moveable with respect to said spindle support solely in the direction of their spindle axis by a numerically controlled z-axis drive for performing at least one of said machining operations;

each of said workpiece spindles being provided with workpiece clamping means for clamping a workpiece and rotating it about said spindle axis;

a working area arranged around said stand, said workpiece spindles protruding into said working area with their workpiece clamping means;

a tool support arranged on said bottom part extending radially beyond said stand in at least one of said spindle stations, said tool support being moveable by a numerically controlled drive in a direction which is transverse to one of said spindle axis and which is positioned in said respective spindle station for performing at least one of said machining operations.

2. A multi-spindle machine tool comprising:

a machine frame which rises above a base;

said machine frame comprising a bottom part standing on the base;

said machine frame further comprising a stand extending upwards from said bottom part;

a spindle support supported by said stand;

said spindle support being rotatable about a rotational axis extending upwardly from said base;

a plurality of workpiece spindles arranged on said spindle support around said rotational axis in individual spindle positions;

said spindle support being rotatable for positioning said workpiece spindles in different spindle stations of said machine frame and said spindle support maintaining said workpiece spindles in a fixed position with respect to said frame for performing machining operations in said spindle stations;

each of said workpiece spindles being individually moveable with respect to said spindle support solely in the direction of their spindle axis by a numerically controlled Z-axis drive for performing at least one of said machining operations;

each of said workpiece spindles being provided with workpiece clamping means for clamping a workpiece and rotating it about said spindle axis;

a working area arranged around said stand, said workpiece spindles protruding into said working area with their workpiece clamping means;

said spindle stations comprising at least one of a loading station and an unloading station with the corresponding working area used for at least one of loading and unloading, and said spindle stations comprising at least one machining station;

said working area in said machining station forming a machining area;

said machining area and said at least one of a loading and unloading area being separated by a separating wall between them;

said separating wall being formed by a stationary wall element which is fixed to said machine frame and having an opening for an area of movement for said spindles and by a moveable wall element rotatable together with said spindle support and closing said opening when said workpiece spindles are positioned in said spindle stations.

3. A multi-spindle machine tool comprising:

a machine frame which rises above a base;

said machine frame comprising a bottom part standing on the base;

said machine frame further comprising a stand extending upwards from said bottom part;

said bottom part extending radially beyond said stand as far as an external part;

a spindle support supported by said stand;

said spindle support being rotatable about a rotational axis extending upwardly from said base;

a plurality of workpiece spindles arranged on said spindle support around said rotational axis in individual spindle positions;

said spindle support being rotatable for positioning said workpiece spindles in different spindle stations of said machine frame and said spindle support maintaining said workpiece spindles in a fixed position with respect to said frame for performing machining operations in said spindle stations;

each of said workpiece spindles being individually moveable with respect to said spindle support solely in the direction of their spindle axis by a numerically controlled z-axis drive for performing at least one of said machining operations;

each of said workpiece spindles being provided with workpiece clamping means for clamping a workpiece and rotating it about said spindle axis;

a working area arranged around said stand, said workpiece spindles protruding into said working area with their workpiece clamping means;

a tool support arranged on said external part in at least one of said spindle stations, said tool support being moveable by a numerically controlled drive with respect to one of said spindle axis which is positioned in said respective spindle station for performing at least one of said machining operations.

4. A multi-spindle machine tool comprising:

a machine frame which rises above a base;

said machine frame comprising a bottom part standing on the base;

said machine frame further comprising a stand extending upwards from said bottom part;

said bottom part extending radially beyond said stand as far as an external part;

a spindle support supported by said stand;

said spindle support being rotatable about a rotational axis extending upwardly from said base;

a plurality of workpiece spindles arranged on said spindle support around said rotational axis in individual spindle positions;

said spindle support being rotatable for positioning said workpiece spindles in different spindle stations of said machine frame and said spindle support maintaining said workpiece spindles in a fixed-position with respect to said frame for performing machining operations in said spindle stations;

each of said workpiece spindles being individually moveable with respect to said spindle support solely in the direction of their spindle axis by a numerically controlled Z-axis drive for performing at least one of said machining operations;

each of said workpiece spindles being provided with workpiece clamping means for clamping a workpiece and rotating it about said spindle axis;

a working area arranged around said stand, said workpiece spindles protruding into said working area with their workpiece clamping means;

a tool support arranged on said bottom part in at least one of said spindle stations, said tool support being moveable by a numerically controlled drive in a direction which is transverse to one of said spindle axis which is positioned in said respective spindle station for performing at least one of said machining operations.

5. A multi-spindle machine tool comprising:

a machine frame which rises above a base;

said machine frame comprising a bottom part standing on said base;

said machine frame comprising support elements extending upwards from said bottom part as far as a support ring which is carried by said support elements;

said bottom part comprising an external part extending as far as said support elements;

said spindle support being rotatable about a rotational axis extending upwardly from said base;

said spindle support being carried in the direction of said rotational axis by said support ring during machining operations;

a plurality of workpiece spindles arranged on said spindle support around said rotational axis in individual spindle positions;

said spindle support being rotatable for positioning said workpiece spindles in different spindle stations of said machine frame and said spindle support maintaining said workpiece spindles in a fixed position with respect to said frame for performing machining operations in said spindle stations;

each of said workpiece spindles being moveable with respect to said spindle support solely in the direction of their spindle axis by a numerically controlled Z-axis drive for performing at least one of said machining operations;

each of said workpiece spindles being provided with workpiece clamping means for clamping a workpiece and rotating it about said spindle axis;

a working area extending above said bottom part of said machine frame;

a tool support arranged on said bottom part in at least one of said spindle stations between said support elements, said tool support being moveable by a numerically controlled drive in a direction which is transverse to one of said spindle axis which is positioned in said respective spindle station for performing at least one of said machining operations.

6. A multi-spindle machine tool comprising:

a machine frame which rises above a base;

said machine frame comprising a bottom part standing on said base;

said machine frame comprising support elements extending upwards from said bottom part as far as a support ring which is carried by said support elements;

said bottom part comprising an external part extending as for as said support elements;

said spindle support being rotatable about a rotational axis extending upwardly from said base;

said spindle support being carried in the direction of said rotational axis by said support ring during machining operations;

a plurality of workpiece spindles arranged on said spindle support around said rotational axis in individual spindle positions;

said spindle support being rotatable for positioning said workpiece spindles in different spindle stations of said machine frame and said spindle support maintaining said workpiece spindles in a fixed position with respect no said frame far performing machining operations in said spindle stations;

each of said workpiece spindles being moveable with respect to said spindle support solely in the direction of their spindle axis by a numerically controlled Z-axis drive for performing at least one of said machining operations;

each of said workpiece spindles being provided with workpiece clamping means for clamping a workpiece and rotating it about said spindle axis;

a working area extending above said bottom part of said machine frame;

said working area comprising an area of movement of said workpiece spindles which is surrounded by said support elements;

said spindle stations comprising at least one of a loading station and an unloading station with the corresponding working area used for at least one of loading and unloading, and said spindle stations comprising at least one machining station;

said working area in said machining station forming a machining area;

said machining area and said at least one of a loading station and an unloading station being separated by a separating wall therebetween;

said separating wall being formed by a stationary wall element fixed to said machine frame and having an opening for said area of movement for said workpiece spindles and by a moveable wall element closing said opening when said workpiece spindles are positioned in said spindle stations.

7. A multi-spindle machine tool comprising:

a machine frame which rises above a base;

said machine frame comprising a bottom part standing on said base;

said machine frame comprising support elements extending upwards from said bottom part as far as a support ring which is carried by said support elements;

said bottom part comprising an external part extending as for as said support elements;

said spindle support being rotatable about a rotational axis extending upwardly from said base;

said spindle support being carried in the direction of said rotational axis by said support ring during machining operations;

a plurality of workpiece spindles arranged on said spindle support around said rotational axis in individual spindle positions;

said spindle support being rotatable for positioning said workpiece spindles in different spindle stations of said machine frame and said spindle support maintaining said workpiece spindles in a fixed position with respect to said frame for performing machining operations in said spindle stations;

each of said workpiece spindles being moveable with respect to said spindle support solely in the direction of their spindle axis by a numerically controlled Z-axis drive for performing at least one of said machining operations;

each of said workpiece spindles being provided with workpiece clamping means for clamping a workpiece and rotating it about said spindle axis;

a working area extending above said bottom part of said machine frame;

said working area comprising an area of movement of said workpiece spindles which is surrounded by said support elements.

8. A multiple-spindle machine tool according to claim 7, wherein:

said machine frame comprises a plurality of spindle stations and said support elements are arranged between successive spindle stations.

9. A multiple-spindle machine tool according to claim 7, wherein:

the rotational axis of the spindle support passes through the stand.

10. A multiple-spindle machine tool according to claim 7, wherein:

the stand is constructed symmetrically to the rotational axis.

11. A multiple-spindle machine tool according to claim 1, wherein:

said stand is constructed as a hollow unit.

12. A multiple-spindle machine tool according to claim 1, wherein:

said stand is provided with reinforcing ribs.

13. A multiple-spindle machine tool according to claim 1, wherein:

an upper part of the stand extends above the bottom part in an unsupported manner.

14. A multiple-spindle machine tool according to claim 1, wherein:

said bottom part comprises an external part which is located radially outside the stand, runs around the stand, and is supported on the base.

15. A multiple-spindle machine tool according to claim 14, wherein:

a foot of the stand is connected to the external part.

16. A multiple-spindle machine tool according to claim 15, wherein:

said foot of the stand is connected to the external part via support elements running radially to the rotational axis.

17. A multiple-spindle machine tool according to claim 1, wherein:

a foot of the stand forms an integral part with the bottom part.

18. A multiple-spindle machine tool according to claim 1, wherein:

said spindle support is rotatably mounted via a bearing which lies radially inside the paths which the workpiece spindles follow during rotation of the spindle support.

19. A multiple-spindle machine tool according to claim 18, wherein:

said stand supports the pivot bearing for the spindle support.

20. A multiple-spindle machine tool according to claim 1, wherein:

said spindle support is supported solely by the stand during machining of the workpieces.

21. A multiple-spindle machine tool according to claim 1, wherein:

a rotary drive for the spindle support is arranged on the stand.

22. A multiple-spindle machine tool according to claim 21, wherein:

said rotary drive is arranged on a head of the stand.

23. A multiple-spindle machine tool according to claim 22, wherein:

said rotary drive is arranged on the head of the stand and extends beyond the head of the stand in the direction of the rotational axis.

24. A multiple-spindle machine tool according to claim 2, wherein:

said bottom part holds a tool support for the tool.

25. A multiple-spindle machine tool according to claim 24, wherein:

said tool support is arranged on an external part of the bottom part.

26. A multiple-spindle machine tool according to claim 25, wherein:

said tool can be moved radially to the spindle axis of the respective workpiece spindle.

27. A multiple-spindle machine tool according to claim 26, wherein:

said tool may be moved and positioned radially to the spindle axis by a numerically controlled X-axis drive.

28. A multiple-spindle machine tool according to claim 1, wherein:

each of said workpiece spindles is equipped with its own linear drive to move it in the direction of the spindle axis.

29. A multiple-spindle machine tool according to claim 28, wherein:

each of said workpiece spindles is constantly coupled to the linear drive.

30. A multiple-spindle machine tool according to claim 28, wherein:

each of said workpiece spindles can be positioned and fixed in a defined manner with regard to their position in the direction of the spindle axis by means of the linear drive.

31. A multiple-spindle machine tool according to claim 1, wherein:

said Z-axis drive sits on the spindle support.

32. A multiple-spindle machine tool according to claim 31, wherein:

the Z-axis drive is arranged on the spindle support to lie radially on the outside in relation to the respective workpiece spindle.

33. A multiple-spindle machine tool according to claim 31, wherein:

said Z-axis drive is arranged in an angular area between two consecutive workpiece spindles.

34. A multiple-spindle machine tool according to claim 33, wherein:

said Z-axis drive is spaced apart from two consecutive workpiece spindles.

35. A multiple-spindle machine tool according to claim 1, wherein:

each of said workpiece spindles is constructed as a motor spindle.

36. A multiple-spindle machine tool according to claim 1, wherein:

said working area comprises an area for movement of the workpiece spindles which runs in a continuous ring around the stand.

37. A multiple-spindle machine tool according to claim 1, wherein:

said working area comprises a chip forming area allocated to at least one spindle station.

38. A multiple-spindle machine tool according to claim 1, wherein:

said working area comprises one of (a) a loading or unloading area allocated to at least one spindle station, and (b) a loading and unloading area allocated to one spindle station.

39. A multiple-spindle machine tool according to claim 38, wherein:

a wall is arranged between the working area and one of (a) said loading or unloading area which is allocated to at least one spindle station, and (b) said loading and unloading area which is allocated to one spindle station.

40. A multiple-spindle machine tool according to claim 1, wherein:

said working area may be accessed from its outer side remote from the stand unhindered by elements running from the spindle support to the bottom part for supporting the spindle support.

41. A multiple-spindle machine tool according to claim 1, wherein:

said working area may be accessed from its outer side remote from the stand unhindered by elements running towards the bottom part for reinforcement of the stand relative to the bottom part.

42. A multiple-spindle machine tool according to claim 1, wherein:

at least one of said spindle stations is constructed as one of (a) a loading or unloading station, and (b) a loading and unloading station.

43. A multiple-spindle machine tool according to claim 1, wherein:

said spindle support may be rotated from a starting position about a maximum angle in one direction as far as an end position and then in the opposite direction back into the starting position again; and a flexible supply assembly following the rotational movement around the maximum angle is guided from the machine frame to the spindle support.

44. A multi-spindle machine tool according to claim 5, wherein:

said support elements are formed by parts which extend in planes which intersect said bottom part and said support ring.

45. A multiple-spindle machine tool according to claim 5, wherein:

said support elements extend radially outwards from a circular path of the workpiece spindles.

46. A multiple-spindle machine tool according to claim 44, wherein:

said support elements are constructed as supporting walls.

47. A multiple-spindle machine tool according to claim 5, wherein:

the number of spindle stations in the working area in which the workpieces spindles may be positioned corresponds no the number of workpiece spindles; and each support element is arranged between two consecutive spindle stations of said plurality of spindle stations.

48. A multiple-spindle machine tool according to claim 5, wherein:

said support elements are spaced at equal angular distances from one another.

49. A multiple-spindle machine tool according to claim 5, wherein:

at least three support elements are provided.

50. A multiple-spindle machine tool according to claim 47, wherein:

one of the support elements is arranged between each two consecutive spindle stations.

51. A multiple-spindle machine tool according to claim 5, wherein:

said support elements with the support ring extend upwards above the bottom part unsupported.

52. A multiple-spindle machine tool according to claim 5, wherein:

said bottom part comprises an external part, which extends as far as the support elements, runs around the rotational axis and is supported on the base.

53. A multiple-spindle machine tool according to claim 52, wherein:

said support elements are connected to the external part.

54. A multiple-spindle machine tool according to claim 5, wherein:

said spindle support is rotatably mounted via a bearing which lies radially outside the paths which the workpiece spindles follow during rotation of the spindle support.

55. A multiple-spindle machine tool according to claim 54, wherein:

said support ring supports the bearing for the spindle support.

56. A multiple-spindle machine tool according to claim 5, wherein:

said spindle support is supported solely by the support ring in a machining position for machining the workpieces (W).

57. A multiple-spindle machine tool according to claim 5, wherein:

a rotary drive for the spindle support is arranged on the support ring.

58. A multiple-spindle machine tool according to claim 57, wherein:

said rotary drive is arranged on the support ring and extends beyond the support ring in the direction of the rotational axis.

59. A multiple-spindle machine tool according to claim 5, wherein:

said support ring engages on the spindle support on a side on its outer periphery.

60. A multiple-spindle machine tool according to claim 5, wherein:

said support ring surrounds the spindle support on a side on its outer periphery.

* * * * *